(12) United States Patent
Wu (10) Patent No.: US 12,002,393 B2
(45) Date of Patent: Jun. 4, 2024

(54) CONTROL METHOD, ELECTRONIC APPARATUS, AND COMPUTER-READABLE STORAGE MEDIUM

(71) Applicant: Lenovo (Beijing) Limited, Beijing (CN)

(72) Inventor: Jing Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/472,941

(22) Filed: Sep. 13, 2021

(65) Prior Publication Data

US 2022/0101767 A1 Mar. 31, 2022

(30) Foreign Application Priority Data

Sep. 29, 2020 (CN) .......................... 202011053227.4

(51) Int. Cl.
*G06F 3/01* (2006.01)
*G06F 1/16* (2006.01)
(Continued)

(52) U.S. Cl.
CPC ............. *G09G 3/035* (2020.08); *G06F 3/013* (2013.01); *G06F 3/04886* (2013.01); *G06V 40/19* (2022.01); *G06F 1/1618* (2013.01); *G06F 1/1677* (2013.01); *G09G 2320/0626* (2013.01); *G09G 2320/0686* (2013.01); *G09G 2354/00* (2013.01); *G09G 2360/144* (2013.01)

(58) Field of Classification Search
CPC ........... G09G 3/035; G09G 2320/0686; G09G 2354/00; G09G 2360/144; G09G 2320/0626; G09G 2356/00; G09G 5/10; G06F 3/013; G06F 3/04886; G06F 1/1618; G06F 1/1677; G06F 1/1686; G06F 1/3215; G06F 1/3231; G06F 1/3265; G06F 3/1423; G06F 3/04847; G06V 40/19; Y02D 10/00
See application file for complete search history.

(56) References Cited

U.S. PATENT DOCUMENTS 11,294,565 B2* 4/2022 VanBlon ................ G06F 1/1652
2002/0109662 A1* 8/2002 Miller .................... G06F 3/1431
345/100

(Continued)

FOREIGN PATENT DOCUMENTS

CN 103853443 A 6/2014
CN 109379489 A 2/2019
(Continued)

*Primary Examiner* — Mihir K Rayan
(74) *Attorney, Agent, or Firm* — ANOVA LAW GROUP, PLLC (57) ABSTRACT

A control method for an electronic apparatus includes obtaining a first positional relationship between eyes of a user and a first display area and a second positional relationship between eyes of the user and a second display area and setting a brightness value of the first display area and a brightness value of the second display area at least based on the first positional relationship and the second positional relationship. The electronic apparatus includes the first display area. The user includes a subject that uses the electronic apparatus. The first display area and the second display area move relative to each other.

18 Claims, 8 Drawing Sheets

(51) Int. Cl.
*G06F 3/04886* (2022.01)
*G06V 40/19* (2022.01)
*G09G 3/00* (2006.01)

(56) References Cited

U.S. PATENT DOCUMENTS

| | | | | |
|---|---|---|---|---|
| 2003/0122777 | A1* | 7/2003 | Grover | G06F 1/1616 |
| | | | | 345/158 |
| 2004/0056900 | A1* | 3/2004 | Blume | G06F 3/0481 |
| | | | | 715/807 |
| 2007/0222730 | A1* | 9/2007 | Kao | G09G 3/2059 |
| | | | | 345/89 |
| 2010/0064244 | A1* | 3/2010 | Kilpatrick, II | H04M 1/0243 |
| | | | | 345/1.3 |
| 2010/0281410 | A1* | 11/2010 | Heintze | G06F 3/0202 |
| | | | | 715/846 |
| 2011/0249042 | A1* | 10/2011 | Yamamoto | G09G 3/342 |
| | | | | 345/690 |
| 2014/0146069 | A1* | 5/2014 | Tan | G06F 3/04845 |
| | | | | 345/589 |
| 2015/0221065 | A1* | 8/2015 | Kim | G09G 3/2092 |
| | | | | 345/660 |
| 2016/0078819 | A1* | 3/2016 | Park | G09G 3/342 |
| | | | | 345/156 |
| 2016/0133169 | A1* | 5/2016 | Park | G09G 3/20 |
| | | | | 345/6 |
| 2017/0116425 | A1* | 4/2017 | Chang | G02B 5/3016 |
| 2020/0202813 | A1* | 6/2020 | Liu | G09G 5/10 |
| 2020/0211440 | A1* | 7/2020 | Lee | G06F 1/1677 |
| 2021/0097957 | A1 | 4/2021 | Tsuchihashi et al. | |

FOREIGN PATENT DOCUMENTS

| | | |
|---|---|---|
| CN | 110275612 A | 9/2019 |
| CN | 111276087 A | 6/2020 |

* cited by examiner

Clamshell Mode　　　　Book Mode　　　　Tent Mode

CONTROL METHOD, ELECTRONIC APPARATUS, AND COMPUTER-READABLE STORAGE MEDIUM

CROSS-REFERENCE TO RELATED APPLICATION

This application claims priority to Chinese Patent Application No. 202011053227.4, filed on Sep. 29, 2020, the entire content of which is incorporated herein by reference.

TECHNICAL FIELD

The present disclosure generally relates to the electronic technology application field and, more particularly, to a control method, an electronic apparatus, and a computer-readable storage medium.

BACKGROUND

As terminals become more intelligent, a display terminal that is deformable and bendable has gained popularity. Thus, a user can view a display area of the terminal from different angles. In everyday life, the user will simultaneously view different display areas of the same terminal and different display areas of different terminals. Different display areas usually are of the same level of brightness. Thus, when the user views different display areas simultaneously, the viewing comfort of the different display areas is impaired. Therefore, the use experience is poor.

SUMMARY

Embodiments of the present disclosure provide a control method for an electronic apparatus. The method includes obtaining a first positional relationship between eyes of a user and a first display area and a second positional relationship between eyes of the user and a second display area and setting a brightness value of the first display area and a brightness value of the second display area at least based on the first positional relationship and the second positional relationship. The electronic apparatus includes the first display area. The user includes a subject that uses the electronic apparatus. The first display area and the second display area move relative to each other.

Embodiments of the present disclosure provide an electronic apparatus, including a processor, a memory, and a communication bus. The memory stores a program that, when executed by the processor, causes the processor to obtain a first positional relationship between eyes of a user and a first display area and a second positional relationship between the eyes of the user and a second display area and set a brightness value of the first display area and a brightness value of the second display area at least based on the first positional relationship and the second positional relationship. The electronic apparatus includes the first display area. The user includes a subject that uses the electronic apparatus. The first display area and the second display area move relative to each other. The communication bus is configured to realize a communication connection between the processor and the memory.

Embodiments of the present disclosure provide a computer-readable storage medium. The computer-readable storage medium stores one or more programs that, when being executed by one or more processors, cause the one or more processors to obtain a first positional relationship between eyes of a user and a first display area and a second positional relationship between the eyes of the user and a second display area and set a brightness value of the first display area and a brightness value of the second display area at least based on the first positional relationship and the second positional relationship. The electronic apparatus includes the first display area. The user includes a subject that uses the electronic apparatus. The first display area and the second display area move relative to each other.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

The technical solutions of embodiments of the present disclosure are described in detail in connection with the accompanying drawings of embodiments of the present disclosure.

The terms "embodiments of the present disclosure" or "previous embodiments" mentioned throughout the specification mean that specific features, structures, or characteristics related to embodiments are included in at least one embodiment of the present disclosure. Therefore, the terms "in embodiments of the present disclosure" or "in the foregoing embodiments" appeared in various places throughout the specification do not necessarily refer to the same embodiment. In addition, these specific features, structures, or characteristics can be combined in one or more embodiments in any suitable manner. In various embodiments of the present disclosure, a size of the sequence number of the above-mentioned steps does not mean the order of execution. The execution order of each step should be determined by its function and internal logic and should not limit the implementation process of embodiments of the present disclosure. The sequence number of embodiments of the present disclosure is only for description and does not represent advantages and disadvantages of embodiments.

Unless otherwise specified, the electronic apparatus executing any step in embodiments of the present disclosure includes a processor of the electronic apparatus executing the step. Embodiments of the present disclosure do not limit the sequence in which the electronic apparatus executes the following steps. In addition, methods for processing data in different embodiments may be the same method or different methods. Any step in embodiments of the present disclosure may be independently executed by the electronic apparatus. That is, the electronic apparatus may execute any step in following embodiments without relying on the execution of other steps.

Specific embodiments described here are merely used to explain the present disclosure and are not used to limit the present disclosure.

Figure 1:
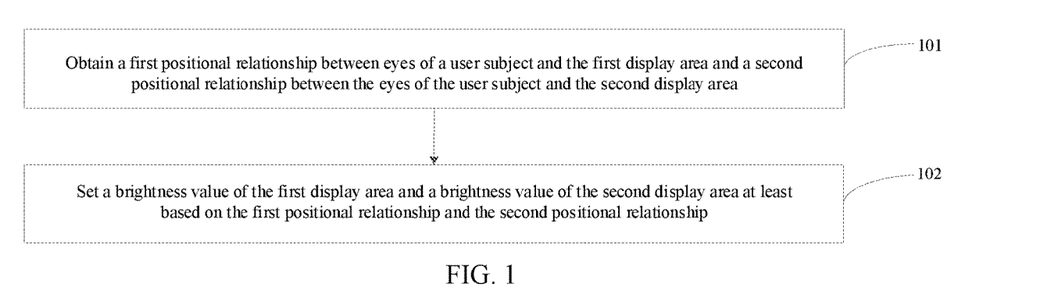
FIG. 1 illustrates a schematic flowchart of a control method to some embodiments of the present disclosure.

Embodiments of the present disclosure provide a control method applied in an electronic apparatus. The electronic apparatus may include a first display area. The control method is used to control the first display area and a second display area. As shown in FIG. 1, the method includes the following steps.

At 101, a first positional relationship between eyes of a user and the first display area and a second positional relationship between the eyes of the user and the second display area are obtained.

The user may include a subject that uses the electronic apparatus. The first display area and the second display area may move relative to each other.

In embodiments of the present disclosure, the electronic apparatus may include any apparatus capable of processing data.

The first display area and the second display area may be different display areas of the electronic apparatus or different display areas of different electronic apparatuses. Basic information such as areas or related dimensions corresponding to the first display area and the second display area may be completely the same, or partially the same, or even completely different, which is not limited by the present disclosure.

In some embodiments, the first display area and the second display area may include two display areas formed by bending a display screen of an electronic apparatus, which includes a flexible screen.

In some other embodiments, the first display area and the second display area may include two display areas provided by any two electronic apparatuses of a notebook computer, a tablet computer, a palmtop computer, a cell phone, or a digital television (TV).

In some other embodiments, the first display area may include a display area provided by the electronic apparatus. The second display area may include a display area provided by a projector that performs information interaction with the electronic apparatus.

In embodiments of the present disclosure, a first content displayed in the first display area and a second content displayed in the second display area may be completely the same, or partially the same, or even completely different.

The first display area and the second display area may move relative to each other. The first display area and the second display area may be partially connected or not connected at all. The first display area and the second display area may be connected through a rotation shaft. A specific positional relationship between the first display area and the second display area is not limited by the present disclosure.

In embodiments of the present disclosure, the eyes of the user may simultaneously view the first content displayed in the first display area and the second content displayed in the second display area or view the first content displayed in the first display area and the second content displayed in the second display area separately according to a predetermined rule.

The user may include one user or two or more users. The present disclosure does not limit the number of users.

At 102, a brightness value of the first display area and a brightness value of the second display area are set at least based on the first positional relationship and the second positional relationship.

In some embodiments, the electronic apparatus may jointly set the brightness value of the first display area and the brightness value of the second display area through the first positional relationship and the second positional relationship.

In some other embodiments, the electronic apparatus may set the brightness value of the first display area and the brightness value of the second display area through the first positional relationship, the second positional relationship, and a relative positional relationship. The relative positional relationship may be a relative positional relationship between the first display area and the second display area.

In some other embodiments, the electronic apparatus may jointly set the brightness value of the first display area and the brightness value of the second display area through eyeglass degrees of the user, the first position relationship, and the second position relationship.

In embodiments of the present disclosure, the electronic apparatus may set the brightness value of the first display area and the brightness value of the second display area through the first positional relationship, the second positional relationship, and other parameters. The other parameters may include an original brightness value of the first display area, an original brightness value of the second display area, the eyeglass degrees of the user, the relative positional relationship between the first display area and the second display area, etc., which is not limited by the present disclosure.

A brightness value of the first display area and a brightness value of the second display area set by the electronic apparatus may be same, or have a certain difference, or include values that may cause the eyes of the user to view the first display area and the second display area with the same brightness.

In the control method provided by embodiments of the present disclosure, the first positional relationship between the eyes of the user and the first display area and the second positional relationship between the eyes of the user and the second display area may be obtained. The user may include the user that uses the electronic apparatus. The first display area and the second display area may move relative to each other. The brightness value of the first display area and the brightness value of the second display area may be set at least based on the first positional relationship and the second positional relationship. As such, the brightness value of the first display area and the brightness value of the second display area may be set through the first positional relationship between the eyes of the user and the first display area and the second positional relationship between the eyes of the user and the second display area. Thus, the viewing comfort of the user may be improved when viewing different display areas simultaneously, and the user viewing effect may be enhanced.

Figure 2:
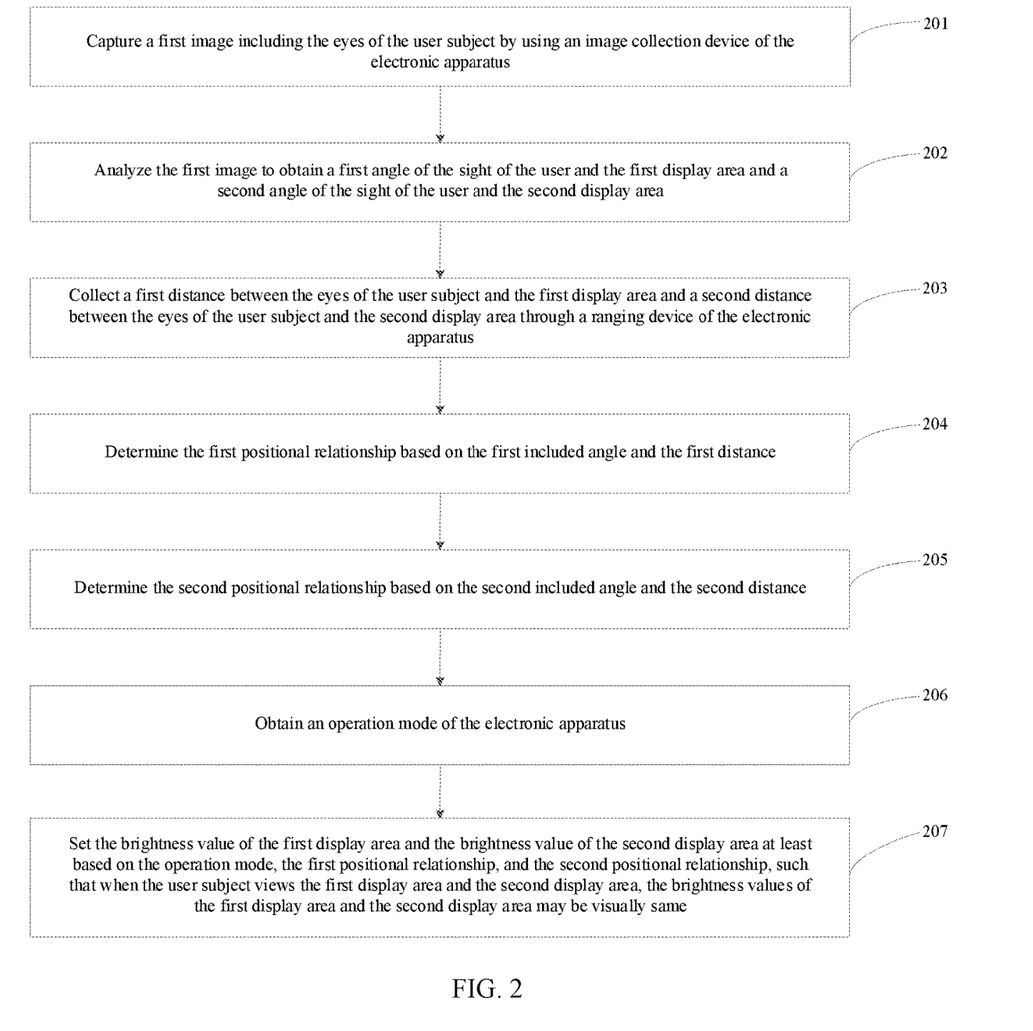
FIG. 2 illustrates a schematic flowchart of another control method according to some embodiments of the present disclosure.

Based on the embodiments above, embodiments of the present disclosure provide a control method. As shown in FIG. 2, the method includes the following steps.

At 201, the electronic apparatus captures a first image with the eyes of the user by using an image collection device of the electronic apparatus.

In embodiments of the present disclosure, the electronic apparatus may capture the first image through the internal image collection device, such as a camera, a recorder, or a scanner. The first image with the eyes of the user may include an image with a face of the user.

At 202, the electronic apparatus analyzes the first image to obtain a first angle of the sight of the user and the first display area and a second angle of the sight of the user and the second display area.

In embodiments of the present disclosure, the electronic apparatus may use image recognition technology to recognize and analyze the first image to obtain the first angle between the sight of the user and a vertical direction where the first display area is located and the second angle between the sight of the user and the vertical direction where the second display area is located.

At 203, the electronic apparatus collects a first distance between the eyes of the user and the first display area and a second distance between the eyes of the user and the second display area through a ranging device of the electronic apparatus.

In embodiments of the present disclosure, the electronic apparatus may collect the first distance between the eyes of the user and the vertical direction where the first display area is located and the second distance between the eyes of the user and the vertical direction where the second display area is located through the internal ranging device, such as a radar.

In some embodiments, the electronic apparatus may obtain the first distance between the eyes of the user and a center position of the first display area and the second distance between the eyes of the user and a center position of the second display area through time of flight (TOF).

At 204, the electronic apparatus determines the first positional relationship based on the first angle and the first distance.

In embodiments of the present disclosure, the electronic apparatus may perform analysis on the first angle and the first distance to determine the first positional relationship.

At 205, the electronic apparatus determines the second positional relationship based on the second angle and the second distance.

In embodiments of the present disclosure, the electronic apparatus may perform analysis on the second angle and the second distance to determine the second positional relationship.

At 206, the electronic apparatus obtains an operation mode of the electronic apparatus.

Under different operation modes, the first display area and the second display area may have different angles.

Figure 3:
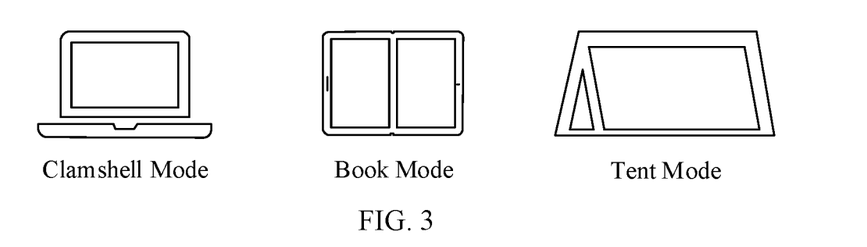
FIG. 3 illustrates a schematic diagram showing three operation modes of a dual-screen electronic apparatus according to some other embodiments of the present disclosure.
Figure 4:
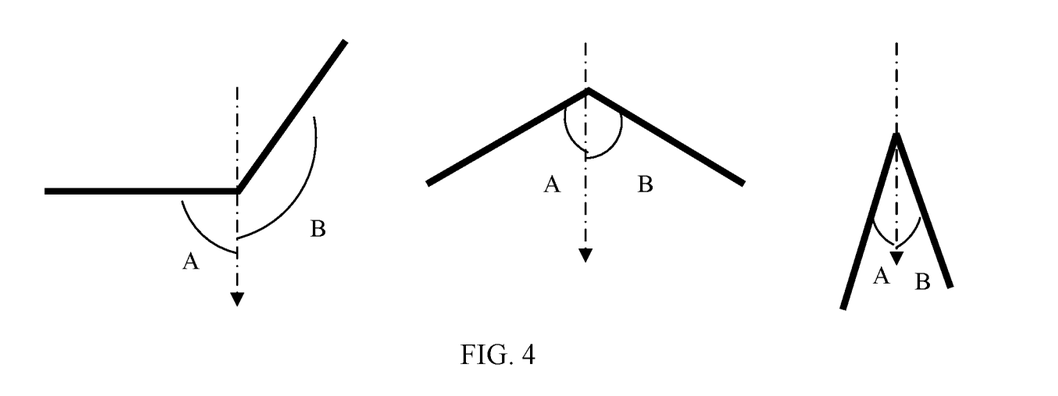
FIG. 4 illustrates a schematic diagram showing a random change of an angle between a first display area and a second display area according to some other embodiments of the present disclosure.

In embodiments of the present disclosure, the operation mode of the electronic apparatus may include but be not limited to a clamshell mode, a book mode, a tent mode, etc. FIG. 3 illustrates a schematic diagram showing three operation modes of a dual-screen electronic apparatus according to some other embodiments of the present disclosure. The first display area and the second display area may have different angles in different modes. The angle of the first display area and the second display area may change randomly in each operation mode. FIG. 4 illustrates a schematic diagram showing a random change of the angle between the first display area and the second display area according to some embodiments of the present disclosure. FIG. 4 illustrates a schematic diagram showing the random change of angle A between the first display area and the vertical direction and angle B between the second display area and the vertical direction.

In some embodiments, the electronic apparatus performing step 206, that is, the electronic apparatus obtaining the operation mode of the electronic apparatus includes the following steps 206a to 206b.

At 206a, the electronic apparatus obtains a first inclined angle of the first display area and a second inclined angle of the second display area.

In embodiments of the present disclosure, the electronic apparatus may obtain the first inclined angle of the first display area relative to a target direction and the second inclined angle of the second display area relative to the target direction. The target direction may be a perpendicular direction at the connection position of the first display area and the second display area.

At 206b, the electronic apparatus determines the operation mode based on the first inclined angle and the second inclined angle.

In embodiments of the present disclosure, the electronic apparatus determines the operation mode of the electronic apparatus based on the first inclined angle and the second inclined angle. The electronic apparatus may control a first display content displayed in the first display area, a second display content displayed in the second display area, a display mode of the first display content, a display mode of the second display content, display time of the first display content, display time of the second display content, etc. based on different operation modes.

At 207, the electronic apparatus sets the brightness value of the first display area and the brightness value of the second display area at least based on the operation mode, the first positional relationship, and the second positional relationship, such that when the user views the first display area and the second display area, the brightness values of the first display area and the second display area may be visually identical.

In embodiments of the present disclosure, the electronic apparatus may first determine a first brightness value of the first display area and a second brightness value of the second display area based on the operation mode of the electronic apparatus. Then, the electronic apparatus may adjust and optimize the first brightness value and the second brightness value according to the first positional relationship and the second brightness value to determine a first target brightness value of the first display area and a second target brightness value of the second display area. Thus, when the user views the first display area and the second display area, the brightness values of the first display area and the second display area may be visually identical.

Figure 5:
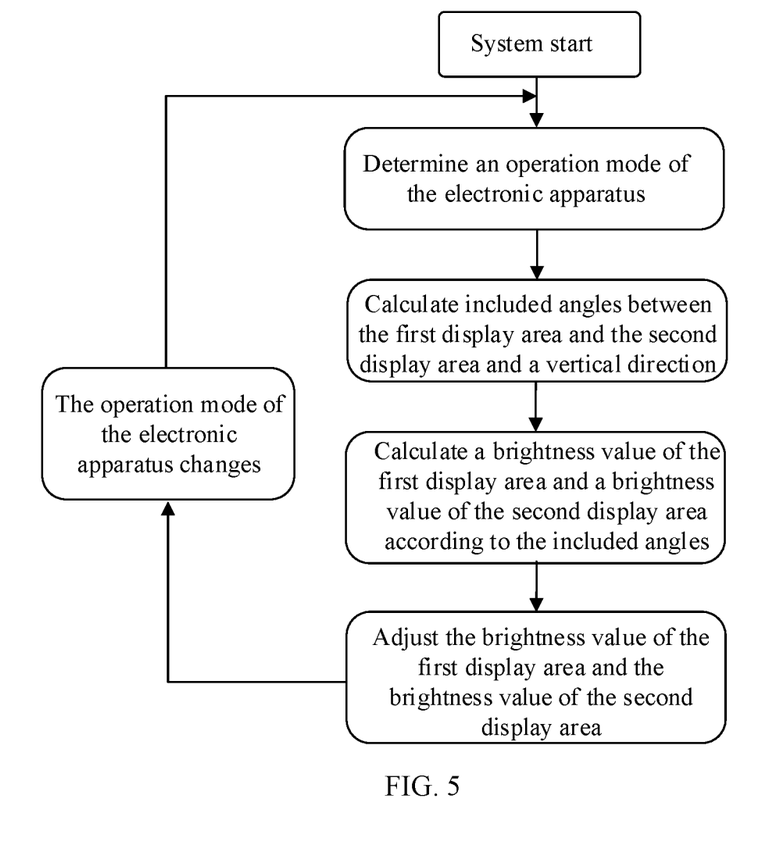
FIG. 5 illustrates a schematic flowchart showing adjustment of brightness value of the first display area and brightness value of the second display area through the operation modes by the electronic apparatus according to some other embodiments of the present disclosure.

After the electronic apparatus is started, the electronic apparatus may directly obtain the operation mode of the electronic apparatus. The electronic apparatus may calculate the first angle between the first display area and the vertical direction and the second angle between the second display area and the vertical direction according to the operation mode. Then, the electronic apparatus may calculate the first brightness value corresponding to the first display area and the second brightness value corresponding to the second display area in the operation mode of the electronic apparatus based on the first angle and the second angle. The electronic apparatus may further adjust the brightness value of the first display area through the first brightness value and the brightness value of the second display area through the second brightness value. Meanwhile, when the operation mode of the electronic apparatus changes, for example, from the book mode to the clamshell mode, the electronic apparatus may re-adjust the brightness value of the first display area and the brightness value of the second display area based on the clamshell mode after the change. FIG. 5 illustrates a schematic flowchart showing the adjustment of the brightness value of the first display area and the brightness value of the second display area through the operation modes by the electronic apparatus according to some other embodiments of the present disclosure.

For descriptions of the same processes and content in embodiments of the present disclosure and other embodiments, reference may be made to the descriptions in other embodiments, which will not be repeated here.

In the control method provided by embodiments of the present disclosure, the electronic apparatus may set the brightness value of the first display area and the brightness value of the second display area at least by obtaining the first positional relationship between the eyes of the user and the first display area and the second positional relationship between the eyes of the user and the second display area. Thus, when the user views the dual-screen from different angles, the brightness values of the first display area and the second display area may be visually the same. Therefore, the viewing comfort of the user may be improved when simultaneously viewing different display areas, and the viewing effect of the user may be enhanced.

Figure 6:
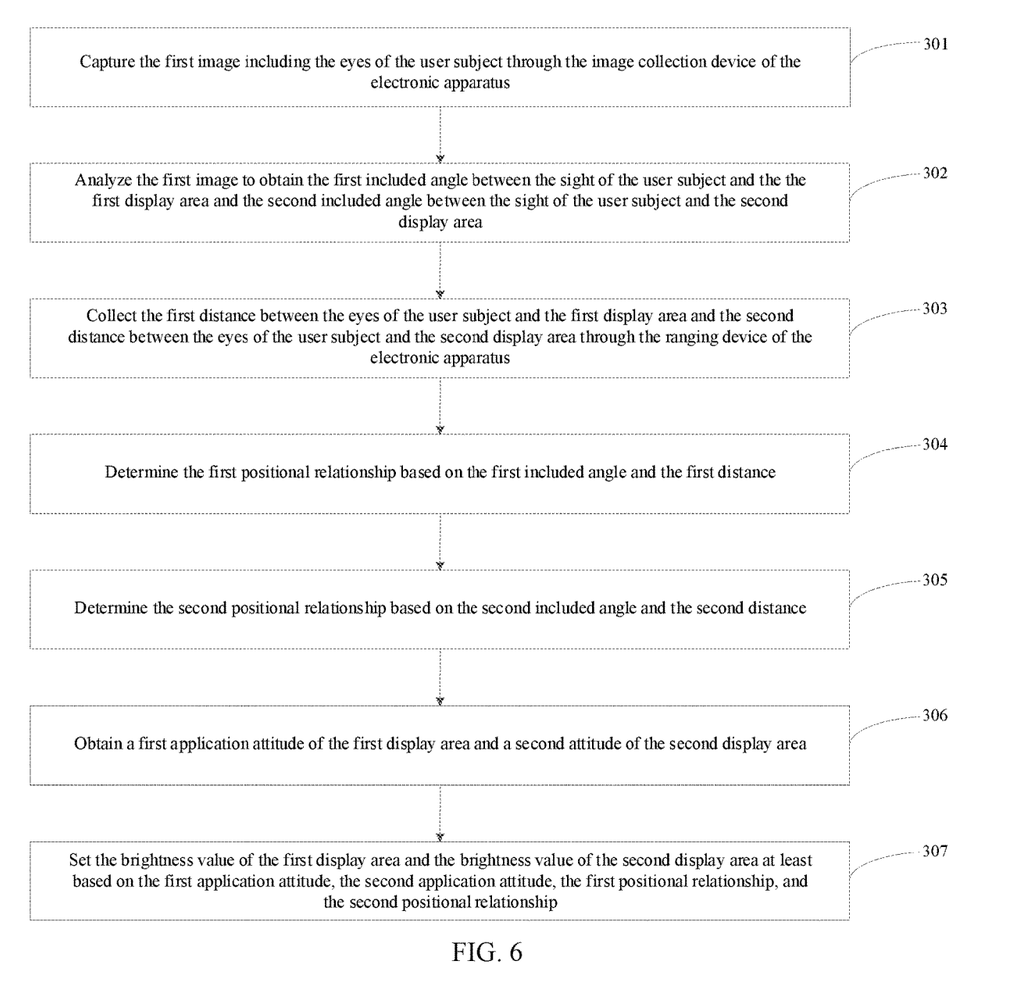
FIG. 6 illustrates a schematic flowchart of another control method according to some other embodiments of the present disclosure.

Based on the embodiments above, embodiments of the present disclosure provide a control method. As shown in FIG. 6, the method includes the following steps.

At 301, the electronic apparatus captures the first image with the eyes of the user through the image collection device of the electronic apparatus.

At 302, the electronic apparatus analyzes the first image to obtain the first angle between the sight of the user and the first display area and the second angle between the sight of the user and the second display area.

At 303, the electronic apparatus collects the first distance between the eyes of the user and the first display area and the second distance between the eyes of the user and the second display area through the ranging device of the electronic apparatus.

At 304, the electronic apparatus determines the first positional relationship based on the first angle and the first distance.

At 305, the electronic apparatus determines the second positional relationship based on the second angle and the second distance.

At 306, the electronic apparatus obtains a first application attitude of the first display area and a second attitude of the second display area.

The first display area and the second display area may be different display areas of the electronic apparatus or different display areas of different electronic apparatuses.

In embodiments of the present disclosure, the first application attitude may include an application state of an element where the first display area is located. Correspondingly, the second application attitude may include an application state of an element where the second display area is located. With different angles between the element where the first display area is located and a horizontal surface, the component may have different first application attitudes. Correspondingly, with different angles between the element where the second display area is located and the horizontal surface, the element may have different second application attitudes.

At 307, the electronic apparatus sets the brightness value of the first display area and the brightness value of the second display area at least based on the first application attitude, the second application attitude, the first positional relationship, and the second positional relationship.

In some embodiments, the electronic apparatus may jointly set the brightness value of the first display area and the brightness value of the second display area according to the first application attitude, the second application attitude, the first positional relationship, and the second positional relationship.

In some embodiments, the electronic apparatus may first set the brightness value of the first display area based on the first application attitude, the first positional relationship, and the second positional relationship. Then, the electronic apparatus may set the brightness value of the second display area based on the second application attitude, the first positional relationship, and the second positional relationship.

For descriptions of the same processes and contents in embodiments of the present disclosure and other embodiments, reference may be made to the descriptions of other embodiments, which will not be repeated here.

In the control method provided by embodiments of the present disclosure, the electronic apparatus may set the brightness value of the first display area and the brightness value of the second display area at least by obtaining the first positional relationship between the eyes of the user and the first display area and the second positional relationship between the eyes of the user and the second display area. The viewing comfort of the user when simultaneously viewing different display areas may be improved. Thus, the user viewing effect may be enhanced.

Figure 7:
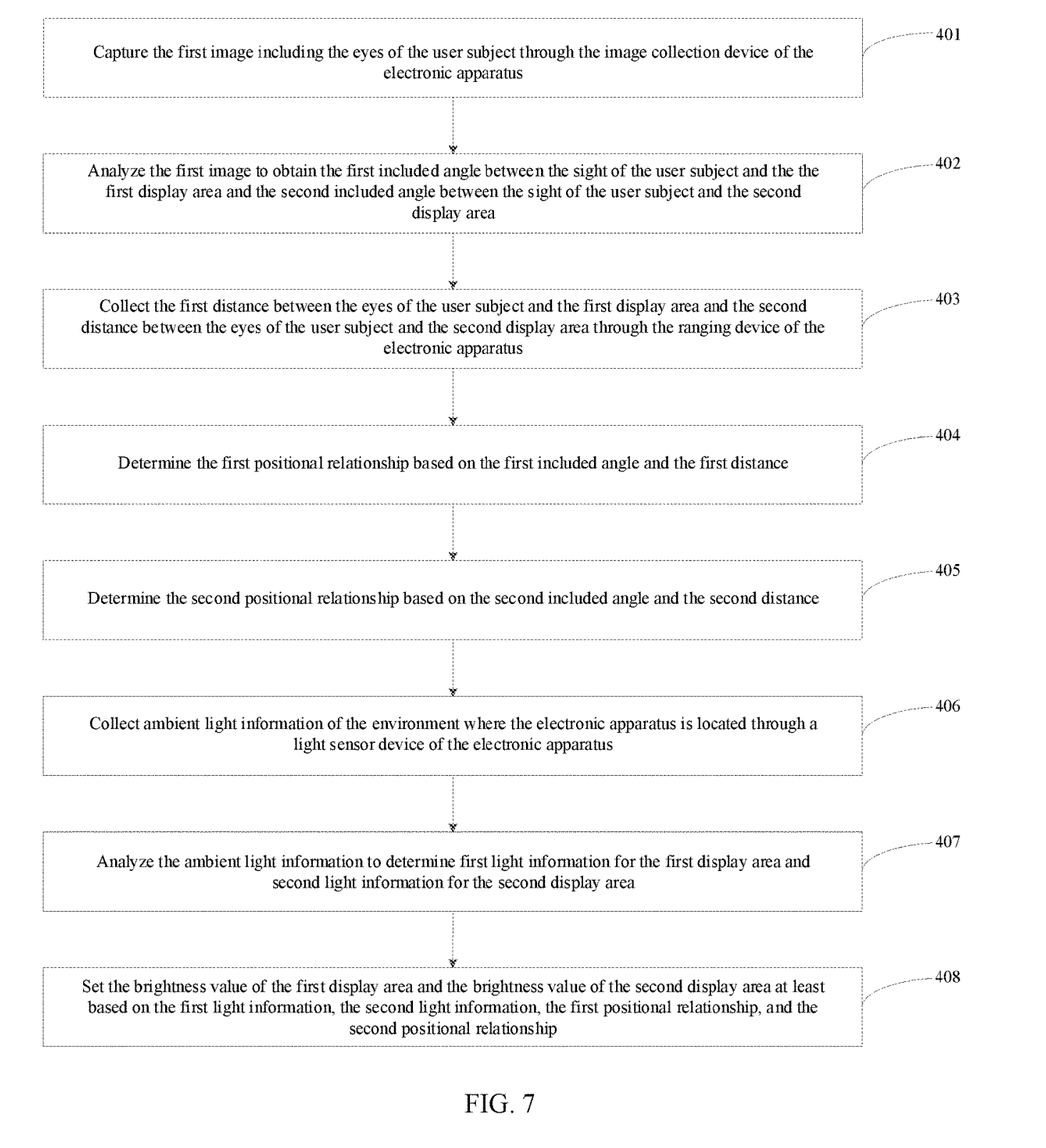
FIG. 7 illustrates a schematic flowchart of another control method according to some other embodiments of the present disclosure.

Based on the embodiments above, embodiments of the present disclosure provide a control method. As shown in FIG. 7, the method includes the following steps.

At 401, the electronic apparatus captures the first image with the eyes of the user through the image collection device of the electronic apparatus.

At 402, the electronic apparatus analyzes the first image to obtain the first angle between the sight of the user and the first display area and the second angle between the sight of the user and the second display area.

At 403, the electronic apparatus collects the first distance between the eyes of the user and the first display area and the second distance between the eyes of the user and the second display area through the ranging device of the electronic apparatus.

At 404, the electronic apparatus determines the first positional relationship based on the first angle and the first distance.

At 405, the electronic apparatus determines the second positional relationship based on the second angle and the second distance.

At 406, the electronic apparatus collects ambient light information of the environment where the electronic apparatus is located through a light sensor device of the electronic apparatus.

In embodiments of the present disclosure, the electronic apparatus may obtain the ambient light information of the environment where the electronic apparatus is located through an ambient light sensor. The ambient light information may include at least a brightness value of the ambient light, an illumination angle of the ambient light, a position of a light source of the ambient light, and a color temperature of the ambient light, etc.

At 407, the electronic apparatus analyzes the ambient light information to determine first light information for the first display area and second light information for the second display area.

The first light information may be different from the second light information.

In embodiments of the present disclosure, the electronic apparatus may analyze the ambient light information, e.g., analyze the brightness or an illumination direction of the ambient light, to obtain the first light information for the first display area and the second light information for the second display area.

In some embodiments, the component where the first display area is located may be perpendicular to the element where the second display area is located. The ambient light is projected perpendicularly to the first display area. Thus, the first display area may obtain the first light information. Correspondingly, the second light information may include light information that is partially reflected to the second display area. The brightness value of the first light information may be stronger than the brightness value of the second light information.

At 408, the electronic apparatus sets the brightness value of the first display area and the brightness value of the second display area at least based on the first light information, the second light information, the first positional relationship, and the second positional relationship.

In embodiments of the present disclosure, The electronic apparatus may set the brightness value of the first display area and the brightness value of the second display area according to the first light information, the second light information, the first positional relationship, the second positional relationship, a first impact value of the light brightness value of the first display area on the second display area, and a second impact value of the light brightness value of the second display area on the first display area.

For descriptions of the same processes and contents in embodiments of the present disclosure and other embodiments, reference may be made to the descriptions of other embodiments, which will not be repeated here.

In the control method provided by embodiments of the present disclosure, the electronic apparatus may set the brightness value of the first display area and the brightness value of the second display area at least by obtaining the first positional relationship between the eyes of the user and the first display area and the second positional relationship between the eyes of the user and the second display area. The viewing comfort of the user when simultaneously viewing different display areas may be improved. Thus, the user viewing effect may be enhanced.

Based on embodiments above, in some other embodiments of the present disclosure, the electronic apparatus obtaining the first positional relationship between the eyes of the user and the first display area and the second positional relationship between the eyes of the user and the second display area, that is, performing step 101 includes steps A1 to A4 below.

At A1, when the eyes of the user are moving relative to the electronic apparatus, the electronic apparatus collects a second image with the eyes of the user according to a predetermined cycle through the image collection device of the electronic apparatus. The electronic apparatus analyzes the second image to obtain a third angle between the sight of the user and the first display area and a fourth angle between the sight of the user and the second display area.

In embodiments of the present disclosure, the electronic apparatus may turn on the image collection device according to the predetermined cycle to capture the user. The second image may include an image including the eyes of the user or at least two or more images including the eyes of the user.

The third angle may be obtained by averaging at least two or more angle values. Correspondingly, the fourth angle may be obtained by averaging at least two or more angle values.

At A2, the electronic apparatus collects a third distance between the eyes of the user and the first display area and a fourth distance between the eyes of the user and the second display area through the ranging device of the electronic apparatus.

In embodiments of the present disclosure, each of the third distance and the fourth distance may be obtained by averaging at least two or more distance values.

At A3, the electronic apparatus determines the first positional relationship based on the third angle and the third distance.

At A4, the electronic apparatus determines the second positional relationship based on the fourth angle and the fourth distance.

Based on the embodiments above, in some other embodiments of the present disclosure, the electronic apparatus may perform steps B1 to B2 below after performing steps 102, 207, 307, and 308.

At B1, the electronic apparatus detects that an external target device is plugged into the electronic apparatus and obtain a first display instruction. The first display instruction is used to control the electronic apparatus to display a target soft keyboard. The target soft keyboard includes a customizable soft keyboard for the user.

In embodiments of the present disclosure, the electronic apparatus may detect an external target device. The external target device may be plugged into the electronic apparatus through a universal serial bus (USB) interface.

Figure 8:
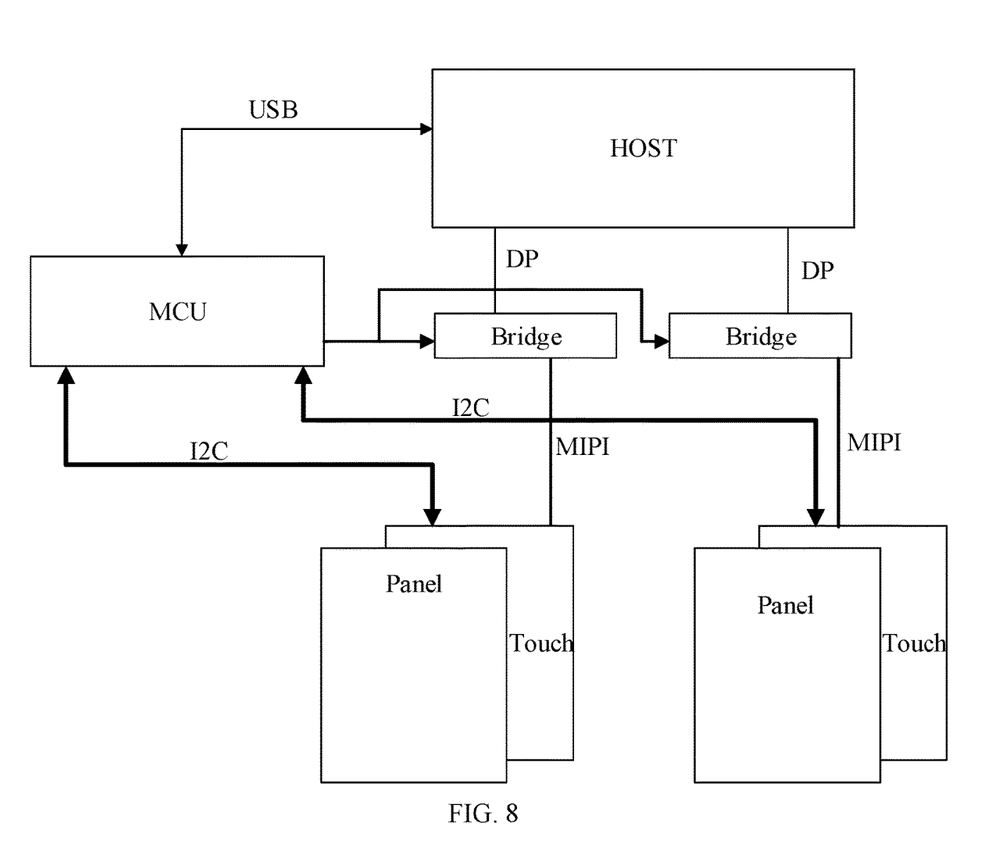
FIG. 8 illustrates a schematic diagram showing information interaction performed by an external target device and the electronic apparatus according to some embodiments of the present disclosure.

The external target device may be configured to provide the electronic apparatus with a customizable soft keyboard for the user. FIG. 8 illustrates a schematic diagram showing information interaction performed by an external target device and the electronic apparatus according to some embodiments of the present disclosure. The external target device may be controlled by a microcontroller unit (MCU). The external target device controlled by the MCU may be plugged into the electronic apparatus (i.e., HOST) through the USB interface. The electronic apparatus (i.e., HOST) may control the first display area and the second display area through a display interface (DisplayPort), a switching unit (Bridge), and a mobile industry processor interface (MIPI). The first display area and the second display area are represented by Panel in FIG. 8. The first display area and the second display area may be touchable (Touch). The external target device may interact with the first display area and the second display area through an inter-integrated circuit (I2C) bus.

In some embodiments, after the external target device is plugged into the electronic apparatus when keyboard input is required, the external target device may turn off the display output of the first display area and/or the second display area through the switching unit. The external target device may output the target soft keyboard provided by the external target device to the first display area and/or the second display area. The target soft keyboard may be output to the first display area and/or the second display area through the I2C bus. During a process of starting the electronic apparatus, if the basic input output system (BIOS) fails, the external target device may directly output the target soft keyboard to the first display area/or the second display area to provide a keyboard input function.

At B2, the electronic apparatus performs the first display instruction to control the first display area and/or the second display area to display the target soft keyboard.

In some embodiments, the electronic apparatus may display the entire soft keyboard at any position of the first display area or the second display area.

In some other embodiments, the electronic apparatus may display a first portion of the target soft keyboard at any position of the first display area and a second portion of the target soft keyboard at any position of the second display area. The target soft keyboard may include the first portion and the second portion. Specific division of the first portion and the second portion is not limited by the present disclosure.

A display mode and a display size of the target soft keyboard are not limited in the present disclosure.

Figure 9:
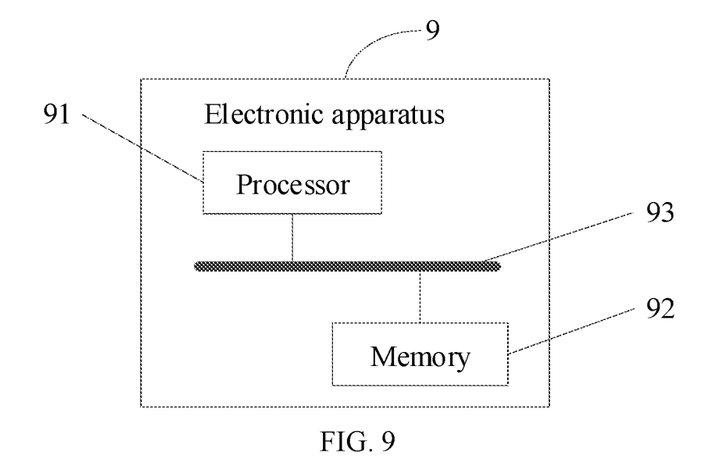
FIG. 9 illustrates a schematic structural diagram of an electronic apparatus according to some embodiments of the present disclosure.

Based on the embodiments above, embodiments of the present disclosure further provide an electronic apparatus 9. The electronic apparatus 9 may be applied to the control methods provided by embodiments corresponding to FIGS. 1, 2, 6, and 7. As shown in FIG. 9, the electronic apparatus 9 includes a processor 91, a memory 92, and a communication bus 93.

The communication bus 93 may be configured to realize a communicative connection between the processor 91 and the memory 92.

The processor 91 may be configured to perform programs stored in the memory 92 to obtain the first positional relationship between the eyes of the user and the first display area and the second positional relationship between the eyes of the user and the second display area. The user may include a subject that uses the electronic apparatus. The first display area and the second display area may move relative to each other.

The processor may be further configured to set the brightness value of the first display area and the brightness value of the second display area at least based on the first positional relationship and the second positional relationship.

In some other embodiments of the present disclosure, to obtain the first positional relationship between the eyes of the user and the first display area and the second positional relationship between the eyes of the user and the second display area, the processor 91 may be further configured to capture the first image including the eyes of the user through the image collection device of the electronic apparatus, analyze the first image to obtain the first angle between the sight of the user and the first display area and the second angle between the sight of the user and the second display area, collect the first distance between the eyes of the user and the first display area and the second distance between the eyes of the user and the second display area through the ranging device of the electronic apparatus, determine the first positional relationship based on the first angle and the first distance, and determine the second positional relationship based on the second angle and the second distance.

In some other embodiments of the present disclosure, to obtain the first positional relationship between the eyes of the user and the first display area and the second positional relationship between the eyes of the user and the second display area, the processor 91 may be further configured to, when the eyes of the user are moving relative to the electronic apparatus, capture the second image including the eyes of the user according to the predetermined cycle through the image collection device of the electronic apparatus, analyze the second image to obtain the third angle between the sight of the user and the first display area and the fourth angle between the sight of the user and the second display area, collect the third distance between the eyes of the user and the first display area and the fourth distance between the eyes of the user and the second display area, determine the first positional relationship based on the third angle and the third distance, and determine the second positional relationship based on the fourth angle and the fourth distance.

In some other embodiments of the present disclosure, to set the brightness value of the first display area and the brightness value of the second display area at least based on the first positional relationship and the second positional relationship, the processor 91 may be further configured to obtain the operation modes of the electronic apparatus and set the brightness value of the first display area and the brightness value of the second display area at least based on the first positional relationship and the second positional relationship. With different operation modes, the angles of the first display area and the second display area may be different. When the user views the first display area and the second display area. Thus, the brightness values may be visually the same.

In some other embodiments of the present disclosure, to obtain the operation modes of the electronic apparatus, the processor 91 may be configured to obtain the first inclined angle of the first display area and the second inclined angle of the second display area and determine the operation modes based on the first inclined angle and the second inclined angle.

In some other embodiments of the present disclosure, to set the brightness value of the first display area and the brightness value of the second display area at least based on the first positional relationship and the second positional relationship, the processor 91 may be further configured to obtain the first application attitude of the first display area and the second application attitude of the second display area and set the brightness value of the first display area and the brightness value of the second display area at least based on the first application attitude, the second application attitude, the first positional relationship, and the second positional relationship. The first display area and the second display area may be different display areas of the electronic apparatus or different display areas of different electronic apparatuses.

In some other embodiments of the present disclosure, to set the brightness value of the first display area and the brightness value of the second display area at least based on the first positional relationship and the second positional relationship, the processor 91 may be further configured to collect the ambient light information of the environment where the electronic apparatus is located through the light sensor device of the electronic apparatus, analyze the ambient light information to determine first light information for the first display area and second light information for the second display area, and set the brightness value of the first display area and the brightness value of the second display area at least based on the first light information, the second light information, the first positional relationship, and the second positional relationship. The first flight information and the second light information may be different.

In some other embodiments of the present disclosure, the processor 91 may be configured to perform the program stored in the memory 92 to detect that the external target device is plugged into the electronic apparatus, obtain the first display instruction, and perform the first display instruction to control the first display area and/or the second display area to display the target soft keyboard. The first display instruction may be used to control the electronic apparatus to display the target soft keyboard. The target soft keyboard may include the customizable soft keyboard for the user.

For a specific implementation process of the processor performing the steps, reference may be made to the implementation steps of the control methods corresponding to FIGS. 1, 2, 6, and 7, which is not limited here.

The electronic apparatus provided by embodiments of the present disclosure may set the brightness value of the first display area and the brightness value of the second display area at least according to the first positional relationship between the eyes of the user and the first display area and the second positional relationship between the eyes of the user and the second display area. The viewing comfort when the user simultaneously views the different display areas may be improved. Thus, the viewing effect of the user may be enhanced.

Based on the embodiments above, embodiments of the present disclosure provide a computer-readable storage medium. The computer-readable storage medium may store one or more programs. The one or more programs may be executed by one or more processors to realize the steps of the control methods provided by embodiments corresponding to FIGS. 1, 2, 6, and 7.

The computer-readable storage medium may include a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, a compact disc read-only memory (CD-ROM), etc. The computer-readable storage medium may also include any memory above or any combination of various electronic apparatuses, such as a cellphone, a computer, a tablet apparatus, a personal digital assistant, etc.

The sequence numbers of embodiments of the present disclosure are for description only, and do not represent the superiority or inferiority of embodiments.

Through the description of the above embodiments, those skilled in the art can clearly understand that the method of the above embodiments can be implemented by software plus a necessary general hardware platform or hardware. In many cases, the method may be implemented by the former method. Thus, the essence of the technical solution of the present disclosure or the part that contributes to the existing technology can be realized in the form of a software product. The computer software product may be stored in a storage medium (such as ROM/RAM, magnetic disk, optical disc) includes several instructions to enable a terminal apparatus (e.g., a cellphone, a computer, a server, an air conditioner, or a network device, etc.) to execute the methods described in embodiments of the present disclosure.

The present disclosure may be described according to flowcharts and/or block diagrams of the methods, the apparatuses (systems), and the computer program products of embodiments of the present disclosure. Each step and/or block in the flowchart and/or block diagram, and the combination of steps and/or blocks in the flowchart and/or block diagram may be implemented by the computer program instructions. These computer program instructions may be provided to the processor of a general-purpose computer, a special-purpose computer, an embedded processor, or other programmable data processing apparatus to produce a machine. Thus, a device may be produced for implement the functions determined by one flow or more flows of the flowcharts and/or one block or more block of the block diagram through the instructions executed by the processor of the computer or other programmable data processing apparatuses.

These computer program instructions may also be stored in a computer-readable memory that can guide a computer or other programmable data processing apparatus to work in a specific manner. Thus, the instructions stored in the computer-readable memory may produce a product, which includes an instruction device. The instruction device may implement functions specified in one or more steps in the flowchart and/or one or more blocks in the block diagram.

These computer program instructions may also be loaded on a computer or another programmable data processing apparatus. Thus, a series of operation steps may be executed on the computer or the other programmable apparatus to produce computer-implemented processing. Therefore, the instructions executed in the computer or the other programmable apparatus may provide steps for implementing the functions specified in one or more steps in the flowchart and/or one or more blocks in the block diagram.

Only some embodiments of the present disclosure are described above. The scope of the present disclosure is not limited by embodiments of the present disclosure. An equivalent structure or equivalent process transformation generated by using the specification and the accompanying drawings of the present disclosure may be directly or indirectly used in another related technical field and are within the scope of the present disclosure.

What is claimed is:

1. A control method for an electronic apparatus, comprising:
    obtaining a first positional relationship between eyes of a user and a first display area and a second positional relationship between eyes of the user and a second display area, the electronic apparatus including the first display area, and the first display area and the second display area moving relative to each other;
    obtaining an operation mode of the electronic apparatus, with different operation modes, angles between the first display area and the second display area being different; and
    setting a first brightness value of the first display area based on the operation mode, the first positional relationship, and the second positional relationship, and jointly setting a second brightness value of the second display area based on the operation mode, the first positional relationship, and the second positional relationship, wherein both the first display area and the second display area are turned on and the user views the first display area having the first brightness value and the second display area having the second brightness value.

2. The method of claim 1, wherein obtaining the first positional relationship between the eyes of the user and the first display area and the second positional relationship between the eyes of the user and the second display area includes:
    capturing a first image including the eyes of the user through an image collection device of the electronic apparatus;

analyzing the first image to obtain a first angle between sight of the user and the first display area and a second angle between the sight of the user and the second display area;

collecting a first distance between the eyes of the user and the first display area and a second distance between the eyes of the user and the second display area through a ranging device of the electronic apparatus;

determining the first positional relationship based on the first angle and the first distance; and determining the second positional relationship based on the second angle and the second distance.

3. The method of claim 2, wherein obtaining the first positional relationship between the eyes of the user and the first display area and the second positional relationship between the eyes of the user and the second display area includes:

in response to the eyes of the user moving relative to the electronic apparatus, capturing a second image including the eyes of the user according to a predetermined cycle through the image collection device of the electronic apparatus, analyzing the second image to obtain a third angle between the sight of the user and the first display area and a fourth angle between the sight of the user and the second display area;

collecting a third distance between the eyes of the user and the first display area and a fourth distance between the eyes of the user and the second display area through the ranging device of the electronic apparatus;

determining the first positional relationship based on the third angle and the third distance; and determining the second positional relationship based on the fourth angle and the fourth distance.

4. The method of claim 1, wherein obtaining the operation mode of the electronic apparatus includes:

obtaining a first inclined angle of the first display area and a second inclined angle of the second display area; and determining the operation mode based on the first inclined angle and the second inclined angle.

5. The method of claim 1, wherein setting the first brightness value of the first display area and jointly setting the second brightness value of the second display area further includes:

obtaining a first application attitude where the first display area is located and a second application attitude where the second display area is located, the first display area and the second display area being different display areas of the electronic apparatus or different display areas of different electronic apparatuses;

setting the first brightness value of the first display area based on the operation mode, the first application attitude, the second application attitude, the first positional relationship, and the second positional relationship; and jointly setting the second brightness value of the second display area based on the operation mode, the first application attitude, the second application attitude, the first positional relationship, and the second positional relationship.

6. The method of claim 5, wherein setting the first brightness value of the first display area and jointly setting the second brightness value of the second display area further includes:

collecting ambient light information of an environment where the electronic apparatus is located through a light sensor device of the electronic apparatus;

analyzing the ambient light information to determine first light information of the first display area and second light information of the second display area, the first light information and the second light information being different;

setting the first brightness value of the first display area based on the operation mode, the first light information, the second light information, the first positional relationship, and the second positional relationship; and jointly setting the second brightness value of the second display area based on the operation mode, the first light information, the second light information, the first positional relationship, and the second positional relationship.

7. The method of claim 1, further comprising:

detecting that an external target device is plugged into the electronic apparatus and obtaining a first display instruction, the first display instruction being used to control the electronic apparatus to display a target soft keyboard, and the target soft keyboard including a customizable soft keyboard for the user; and performing the first display instruction to control the first display area and/or the second display area to display the target soft keyboard.

8. The method of claim 1, wherein setting the first brightness value of the first display area and jointly setting the second brightness value of the second display area further includes:

obtaining a third positional relationship between the first display area and the second display area;

setting the first brightness value of the first display area based on the operation mode, the first positional relationship, the second positional relationship, and the third positional relationship; and jointly setting the second brightness value of the second display area based on the operation mode, the first positional relationship, the second positional relationship, and the third positional relationship.

9. The method of claim 1, wherein when the user views the first display area having the first brightness value and the second display area having the second brightness value, a brightness of the first display area and a brightness of the second display area are visually identical.

10. An electronic apparatus, comprising:
a processor;
a memory storing a program that, when executed by the processor, causes the processor to:
obtain a first positional relationship between eyes of a user and a first display area and a second positional relationship between the eyes of the user and a second display area, the electronic apparatus including the first display area, the user including a subject that uses the electronic apparatus, and the first display area and the second display area moving relative to each other;

obtain an operation mode of the electronic apparatus, with different operation modes, angles between the first display area and the second display area being different; and set a first brightness value of the first display area based on the operation mode, the first positional relationship, and the second positional relationship, and jointly set a second brightness value of the second display area based on the operation mode, the first positional relationship, and the second positional relationship, wherein both the first display area and the second display area are turned on and the user views the first display area having the first brightness value and the second display area having the second brightness value; and a communication bus configured to realize a communication connection between the processor and the memory.

11. The electronic apparatus of claim 10, wherein the processor is further caused to:

capture a first image including the eyes of the user through an image collection device of the electronic apparatus;

analyze the first image to obtain a first angle between sight of the user and the first display area and a second angle between the sight of the user and the second display area;

collect a first distance between the eyes of the user and the first display area and a second distance between the eyes of the user and the second display area through a ranging device of the electronic apparatus;

determine the first positional relationship based on the first angle and the first distance; and determine the second positional relationship based on the second angle and the second distance.

12. The electronic apparatus of claim 11, wherein the processor is further caused to:

in response to the eyes of the user moving relative to the electronic apparatus, capture a second image including the eyes of the user according to a predetermined cycle through the image collection device of the electronic apparatus, analyze the second image to obtain a third angle between the sight of the user and the first display area and a fourth angle between the sight of the user and the second display area;

collect a third distance between the eyes of the user and the first display area and a fourth distance between the eyes of the user and the second display area through the ranging device of the electronic apparatus;

determine the first positional relationship based on the third angle and the third distance; and determine the second positional relationship based on the fourth angle and the fourth distance.

13. The electronic apparatus of claim 10, wherein the processor is further caused to:

obtain a first inclined angle of the first display area and a second inclined angle of the second display area; and determine the operation mode based on the first inclined angle and the second inclined angle.

14. The electronic apparatus of claim 10, wherein the processor is further caused to:

obtain a first application attitude where the first display area is located and a second application attitude where the second display area is located, the first display area and the second display area being different display areas of the electronic apparatus or different display areas of different electronic apparatuses;

set the first brightness value of the first display area based on the operation mode, the first application attitude, the second application attitude, the first positional relationship, and the second positional relationship; and set the second brightness value of the second display area based on the operation mode, the first application attitude, the second application attitude, the first positional relationship, and the second positional relationship.

15. The electronic apparatus of claim 14, wherein the processor is further caused to:

collect ambient light information of an environment where the electronic apparatus is located through a light sensor device of the electronic apparatus;

analyze the ambient light information to determine first light information of the first display area and second light information of the second display area, the first light information and the second light information being different;

set the first brightness value of the first display area based on the operation mode, the first light information, the second light information, the first positional relationship, and the second positional relationship; and set the second brightness value of the first display area based on the operation mode, the first light information, the second light information, the first positional relationship, and the second positional relationship.

16. The electronic apparatus of claim 10, wherein the processor is further caused to:

detect that an external target device is plugged into the electronic apparatus and obtain a first display instruction, the first display instruction being used to control the electronic apparatus to display a target soft keyboard, and the target soft keyboard including a customizable soft keyboard for the user; and perform the first display instruction to control the first display area and/or the second display area to display the target soft keyboard.

17. A non-transitory computer-readable storage medium storing one or more programs that, when being executed by one or more processors, cause the one or more processors to:

obtain a first positional relationship between eyes of a user and a first display area and a second positional relationship between the eyes of the user and a second display area, the electronic apparatus including the first display area, the user including a subject that uses the electronic apparatus, and the first display area and the second display area moving relative to each other;

obtain an operation mode of the electronic apparatus, with different operation modes, angles between the first display area and the second display area being different; and set a first brightness value of the first display area based on the operation mode, the first positional relationship, and the second positional relationship, and jointly set a second brightness value of the second display area based on the operation mode, the first positional relationship, and the second positional relationship, wherein both the first display area and the second display area are turned on and the user views the first display area having the first brightness value and the second display area having the second brightness value.

18. The non-transitory computer-readable storage medium of claim 17, wherein the one or more processors are further caused to:

capture a first image including the eyes of the user through an image collection device of the electronic apparatus;

analyze the first image to obtain a first angle between sight of the user and the first display area and a second angle between the sight of the user and the second display area;

collect a first distance between the eyes of the user and the first display area and a second distance between the eyes of the user and the second display area through a ranging device of the electronic apparatus;

determine the first positional relationship based on the first angle and the first distance; and determine the second positional relationship based on the second angle and the second distance.

* * * * *